United States Patent [19]

Voyer et al.

[11] 3,927,267

[45] Dec. 16, 1975

[54] TIME DIVISION SWITCHING SYSTEM OF THE "TIME-SPACE-TIME" TYPE

[76] Inventors: Paul Voyer, Rue des Carrieres, La Clarte, 22700 Perros-Guirec; Jean-Marc B. Pitié, 106, Rue Blaise pascal, 86300 Poitiers; Olivier F. Louvet, 82, Residence Corlay, 22300 Lannion; Alain Y. Roche, 41, Rue du Sergent L'Heveder, 22700 Perros-Guirec, all of France

[22] Filed: Apr. 8, 1974

[21] Appl. No.: 458,881

[30] Foreign Application Priority Data

Apr. 6, 1973 France .............................. 73.12517

[52] U.S. Cl.......................... 179/15 AT; 179/15 AQ

[51] Int. Cl.² ............................................ H04J 3/00

[58] Field of Search.................... 179/15 AT, 15 AQ

[56] References Cited

UNITED STATES PATENTS

| | | | |
|---|---|---|---|
| 3,632,883 | 1/1972 | Aagaard | 179/15 AQ |
| 3,735,049 | 5/1973 | Buchner | 179/15 AQ |
| 3,832,492 | 8/1974 | Charransol | 179/15 AT |

*Primary Examiner*—Thomas A. Robinson
*Attorney, Agent, or Firm*—Abraham A. Saffitz

[57] ABSTRACT

Time division switching system of the type comprising incoming time-division switching networks, intermediate space-division switching networks and outgoing time-division switching networks. The incoming and outgoing time-division switching networks are respectively output controlled and input controlled or vice versa. They are controlled by a single control store for the two directions of transmission. Due to the serialization of the incoming and outgoing time-division junctions connecting respectively the incoming and outgoing time-division switching networks to the intermediate space-division switching networks, the space-division switching networks can be controlled by a single control store for the two directions of transmission.

4 Claims, 10 Drawing Figures

TIME DIVISION SWITCHING SYSTEM OF THE "TIME-SPACE-TIME" TYPE

The present invention relates to a time-division digital switching system wherein time slots recurring in time multiplex circuits forming part of a plurality of incoming multiplex circuits are connected to time slots recurring in time multiplex circuits forming part of a plurality of outgoing multiplex circuits.

More particularly, the invention relates to a time-division switching system of the type comprising two time-division multiplex stages surrounding a space-division multiplex stage and frequently called a "T-S-T" type.

T-S-T type time-division switching systems are known in the prior art. As is known, they comprise incoming time-division switching networks forming the input stage, outgoing time-division switching networks forming the output stage, and a space-division switching network forming an intermediate stage and connected to the incoming time-division switching networks via incoming group highways and to the outgoing time-division switching networks via outgoing group highways. The multiplex space-division switching network selectively and recurrently routes the time slots of the incoming group highways towards the outgoing group highways, and comprises a series of gates performing routing operations and a store controlling the aforementioned gates. An incoming and outgoing time-division switching network comprises a buffer memory containing a number of words equal to the total number of time slots on the multiplex circuits or highways entering (or issuing from) the switching network, each word of a given address in the buffer store being permanently associated with a given time slot of a given incoming (or outgoing) multiplex circuit or highway, and also comprises a control store having a number of words equal to the total number of time slots on the group highways or circuits issuing from (or entering) the switching network, each word of a given address in the control store being permanently associated with a given time slot of a given outgoing (or incoming) group highway or multiplex circuit and used for addressing the buffer store for read-out. This type of time-division switching network is called "output-controlled". An "input-controlled" time-division switching network comprises a buffer store whose words are permanently associated with the outgoing time slots and a control store whose words are permanently associated with the incoming time slots and used to address the buffer store for write-in.

A considerable amount of material is required for constructing the control stores for the multiplex time-division stages and space-division stage of a high-capacity switching system, and attempts have been made to reduce this amount by using a single control store to control a number of switching operations.

The object of the invention is to reduce, and in fact, to halve, the capacity of the control stores of the time-division switching networks of the "time-space-time" type used for switching bidirectional links. The invention also applies to other types of symmetrical systems (STS, TSST, etc., where T designates a time-division stage and S a space-division stage).

According to the invention, the incoming time-division switching networks are output-controlled and the outgoing time-division switching networks are input-controlled; these switching networks are associated in pairs and controlled by a single control store. The incoming multiplex circuit and the outgoing multiplex circuit and the corresponding time slots associated with the switched link for both directions of transmission thereon are associated in pairs and respectively correspond to words of the same address in the respective buffer stores of the associated incoming and outgoing time-division switching networks.

A single control store can control an incoming time switching network and the associated outgoing time switching network due to the fact that two associated time slots, e.g. an even time slot and the following odd time slot, are systematically allotted to the two transmission directions respectively of a switched link, on the multiplex junctions and in the multiplex space-division switching network. A similar result can be obtained with an input-controlled incoming time-division switching network and an output-controlled outgoing time-division switching network.

In TST-type time-division switching systems of the prior art, the multiplex junctions are parallel junctions and connect the time-division stages to a single space-division stage. If, for example, the incoming and outgoing time-division switching networks are respectively connected to 16 incoming and 16 outgoing time-division multiplex circuits, each comprising 32 time slots per frame, making a total of 512 time slots, if the transmitted words are bytes or octets, and if the time-division switching networks are "square", i.e. have the same number of inputs and outputs (time-division switching networks without expansion or concentration), each incoming or outgoing multiplex junction comprises eight multiplex channels each corresponding to a bit in the octets to be transmitted, the channels comprising 512 time slots per frame. In order to make a connection between an incoming multiplex junction and an outgoing multiplex junction, 8 AND gates operating in parallel (one AND-gate per channel) must be recurrently opened in the multiplex space-division switching network for a time slot equal to 1/512th of a frame.

According to the invention, each multiplex junction, instead of being a multichannel parallel junction in which the bits of a single word occupy a same time slot, comprises an assembly of $n$ multiplex sub-junctions in series, wherein the time slots for transmitting a complete word, one bit at a time, are $n$ times less numerous per frame, last $n$ times longer and are offset from one sub-junction to another, i.e. the words leaving an incoming time-division switching network, for example, are systematically routed towards the sub-junctions 0, 1, . . . $n$, 0, . . . In the defined example of words having 8 bits, there are $n = 8$ multiplex sub-junctions associates with each time-division switching network, numbered from 0 to 7 and each having 64 times slots. The numerical output flow of each link is the same as in the case of parallel transmission.

The multiplex space-division stage, instead of being a parallel multiplex space-division switching network, comprises an assembly of $n$ serial multiplex space-division switching subnetworks connecting the incoming and outgoing multiplex sub-junctions having the same number. In the example described, there are 8 serial multiplex switching sub-networks numbered from 0 to 7. The routing equipment is the same as in the case of a parallel switch simultaneously switching eight parallel bits.

The resulting independence between the $n$ space-division circuits has the advantage of improved reliability of operation: lower-grade operation is still possible if a sub-junction breaks down, whereas the corresponding time-division switching network fails if a breakdown occurs in the case of a single parallel multiplex junction.

In the case of bidirectional connection, the choice of the multiplex time slots in relation to the two directions of transmission allows the systematic utilisation of the two groups of multiplex sub-junctions and of the spatial multiplex switching sub-networks forming pairs. In the example described, the couples are the four assemblies 0, 1 ; 1,3 ; 4, 5 ; 6, 7. 2, 3

Some of the multiplex space-division switching sub-networks, e.g. the even ones, are output-controlled, i.e. the control store selects which incoming multiplex sub-junction is to be connected, at each time slot, to each outgoing multiplex sub-junction, whereas the associated, e.g. odd, multiplex space-division switching sub-networks are input-controlled, i.e. the control store selects which outgoing group sub-highway is to be connected, at each time slot, to each incoming group sub-highway.

We shall show that, under these conditions, two multiplex space-division switching sub-networks can be controlled by a single control store.

The invention will now be described in detail with reference to the accompanying drawings in which.

Figure 5A:
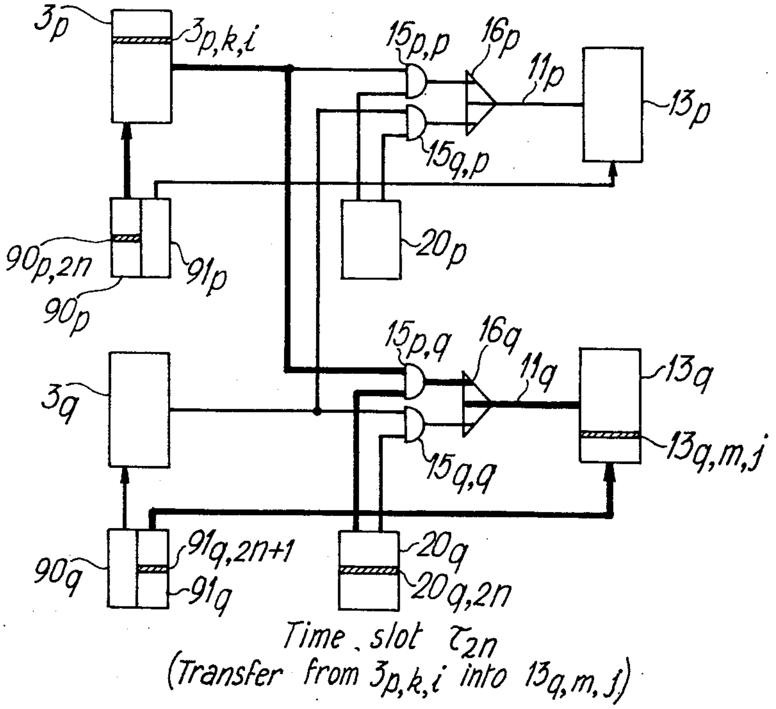
Figure 5B:
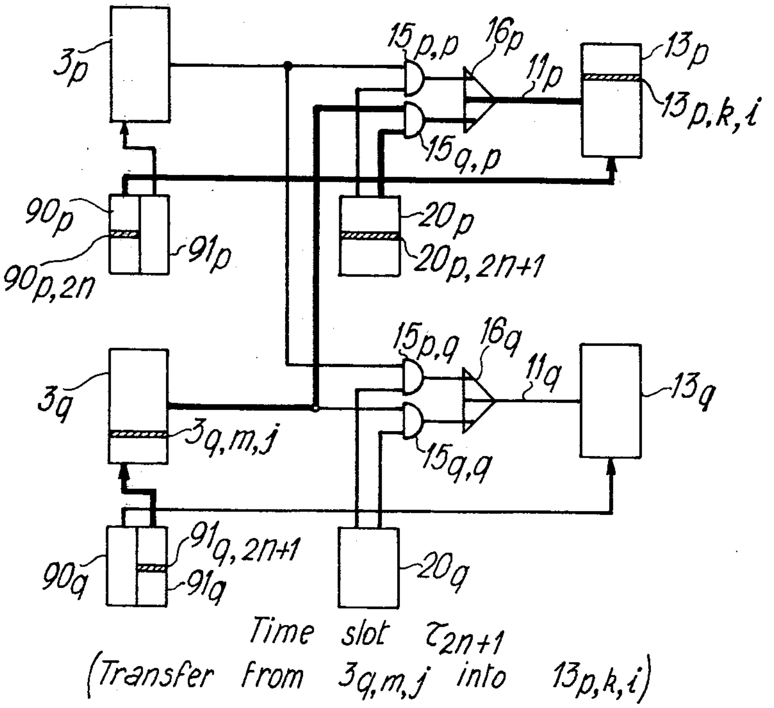
Figure 6:
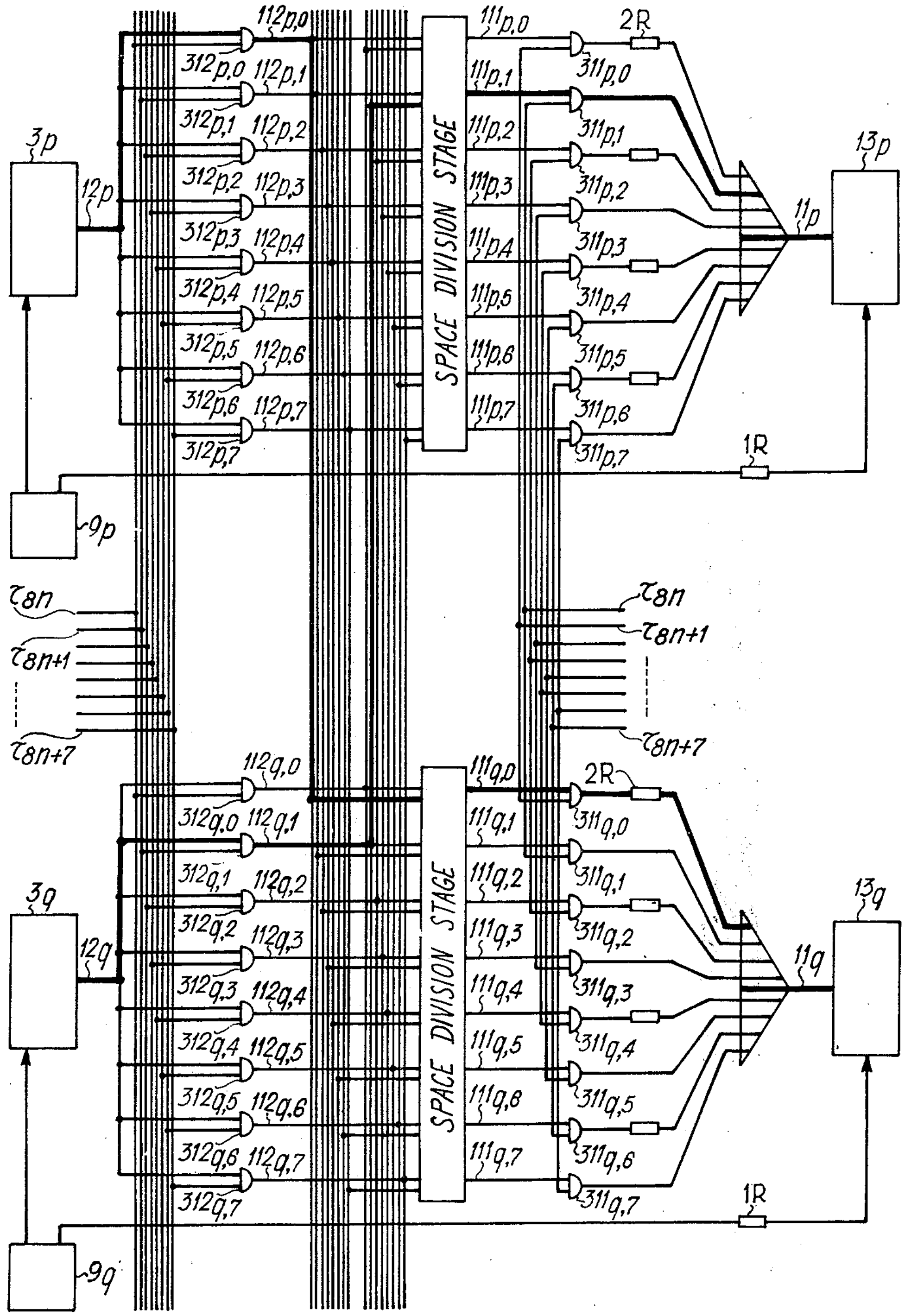
Figure 7:
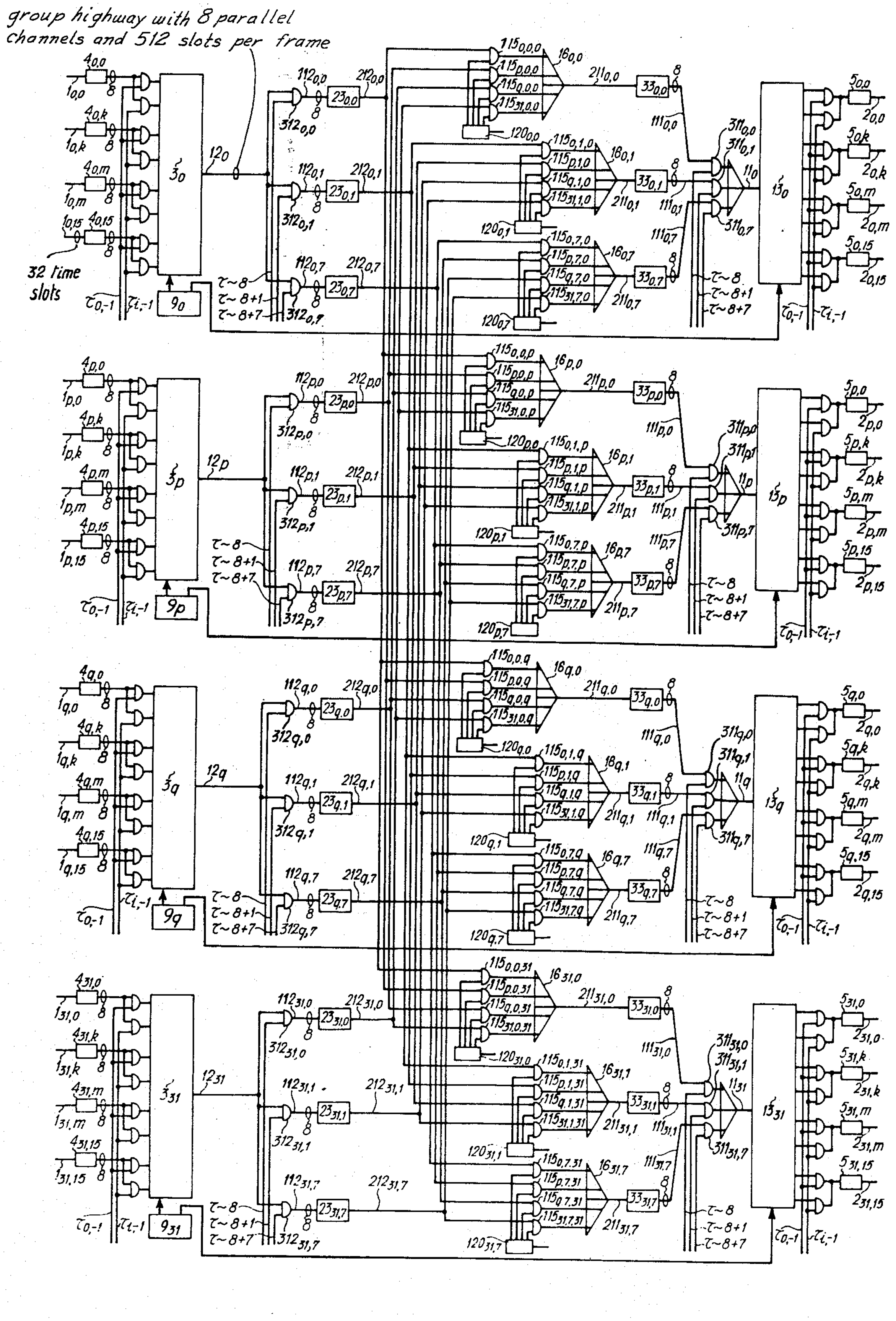
Figure 8:
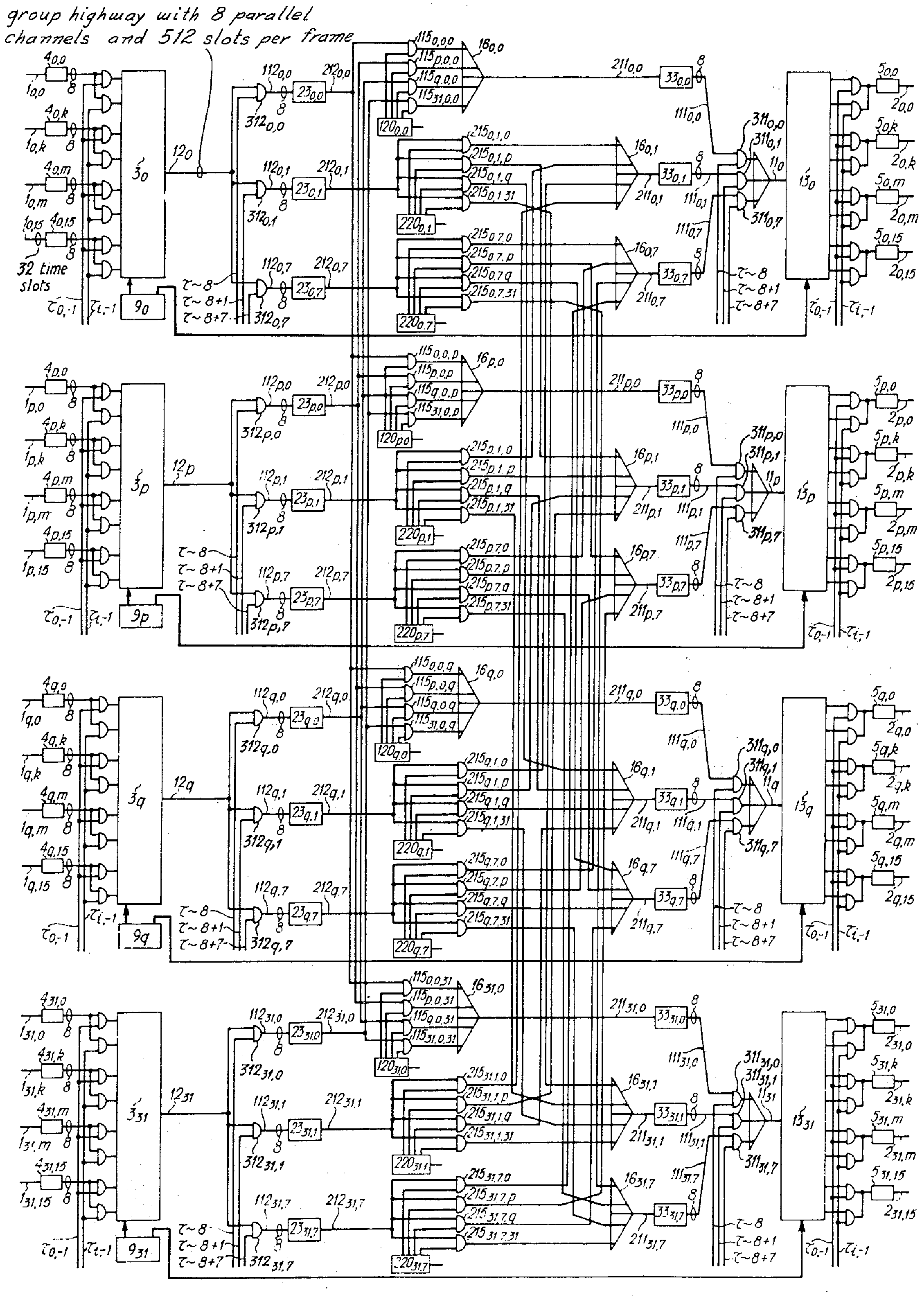
Figure 9:
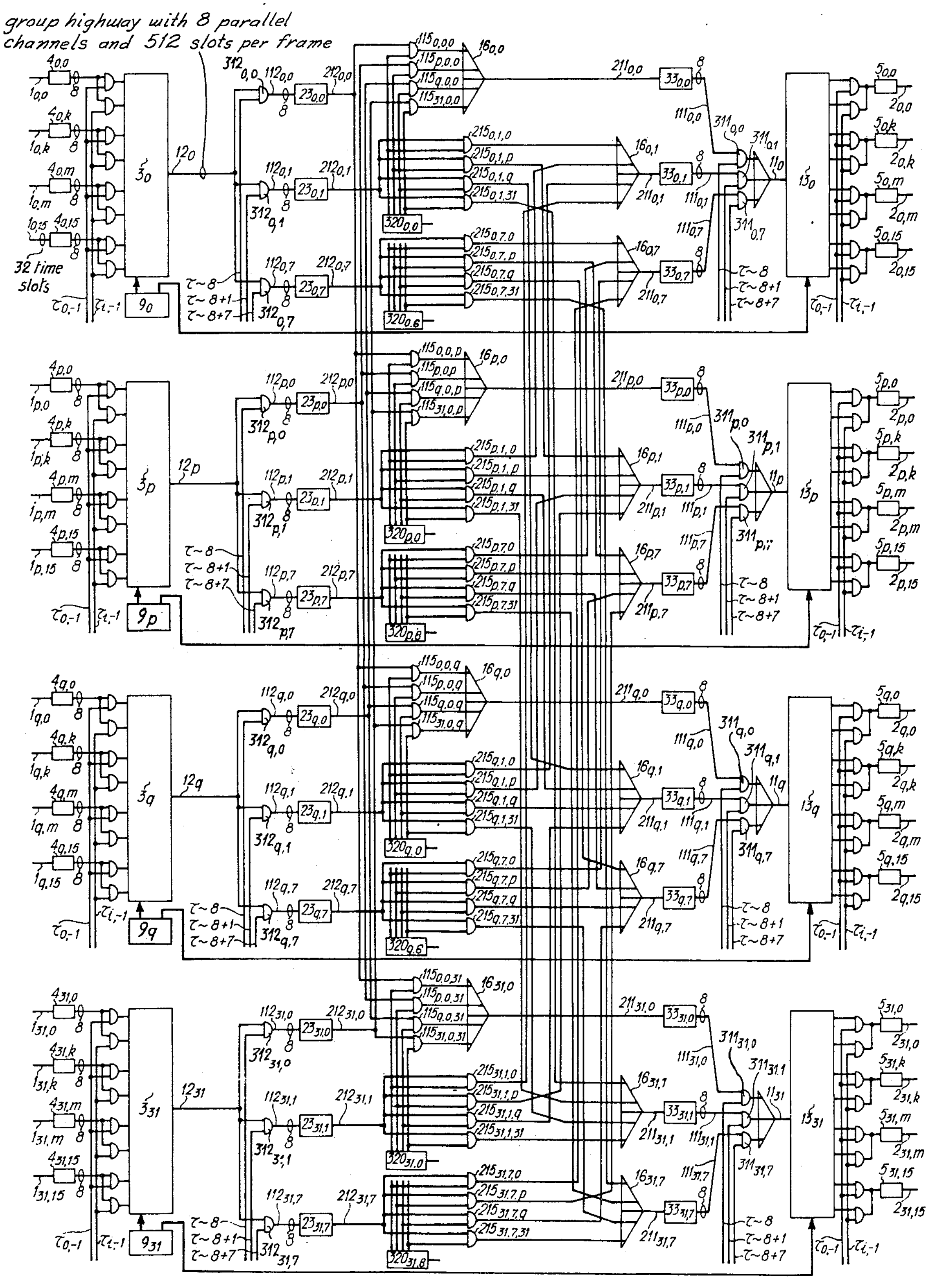

FIGS. 5$a$ and 5$b$, is a more detailed diagram of a single means for controlling two time-division stages;

FIG. 6 is a more detailed diagram of another single means for controlling two time-division stages;

FIG. 7 shows a time-division switching system comprising multiple serialized group sub-highways;

FIG. 8 is based on FIG. 5 except that the old space-division switching sub-networks are input-controlled and the even space-division switching sub-networks are output-controlled; and FIG. 9 shows a time-division switching system wherein the group sub-highway and the multiplex space-division switching sub-networks are associated in couples, two associated space-division switching sub-networks being controlled by a single control store, one being input-controlled and the other being output-controlled.

TIME (FIG. 1) AND TIME-SPACE-TIME (FIGS. 2 and 3) DIVISION SWITCHING SYSTEM OF THE PRIOR ART In what follows, we shall assume that the time-multiplex circuits connected to the switching network have a 125 $\mu s$ frame divided into 32 time slots each of 3.9 $\mu s$ and numbered from $t_o$ to $t_{31}$.

Figure 1:
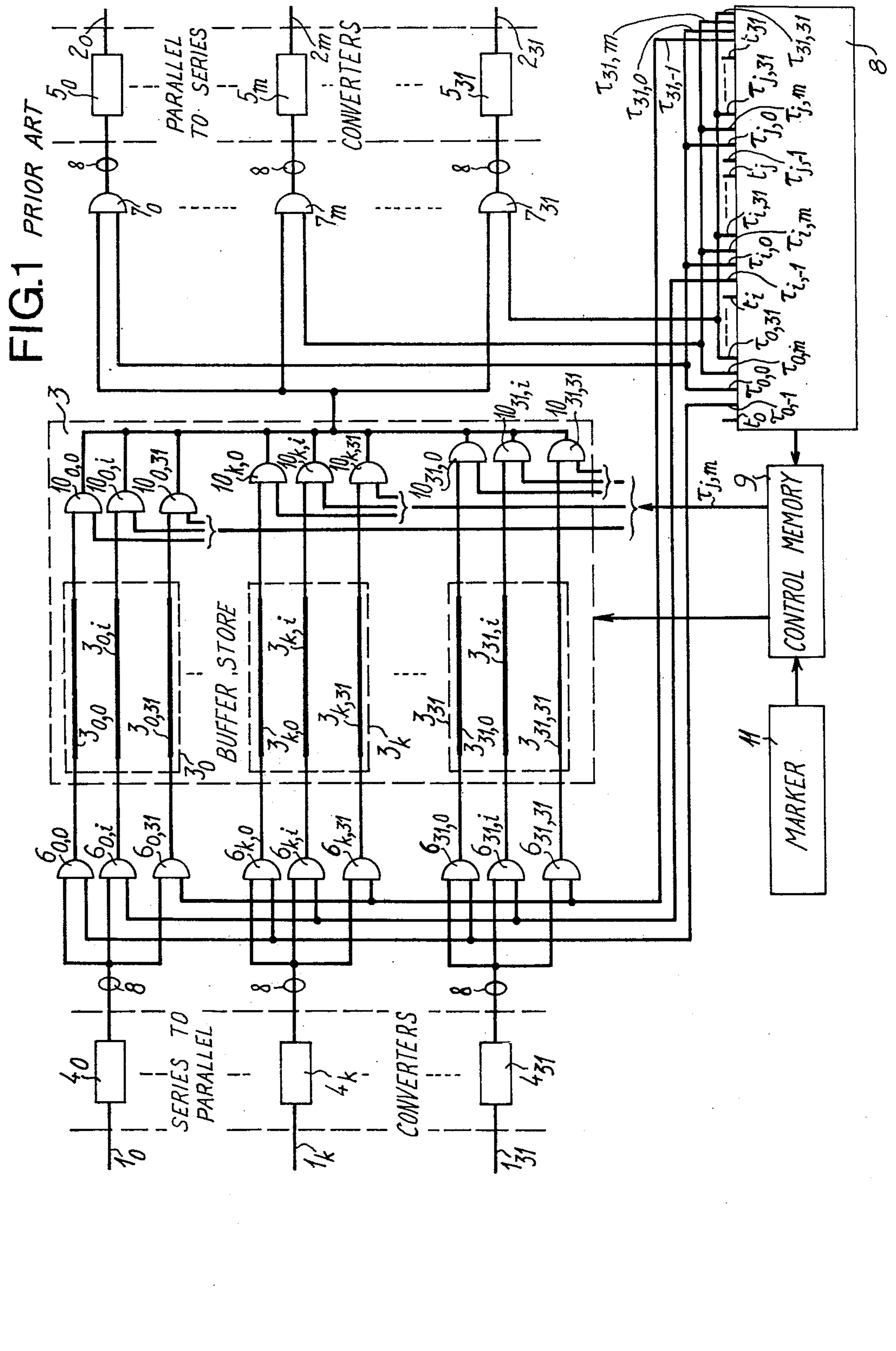
FIG.1 PRIOR ART
FIG. 1 represents a known output-controlled time-division switching network.

FIG. 1 shows a prior art time-division switching system comprising an output-controlled time-division switch capable of switching any time slot from among those in 32 incoming multiplex circuits $\mathbf{1}_0$ to $\mathbf{1}_{31}$ to any time slot from among those in 32 outgoing multiplex circuits $\mathbf{2}_0$ to $\mathbf{2}_{31}$. Such a switching system is for example disclosed in U.S. Pat. No. 3,735,049 issued May 22, 1973 in the name of Robert B. Buchner et al.

The switching system comprises a buffer store 3 having 1024 words, each comprising 8 bits and divided into 32 sections $\mathbf{3}_0$ to $\mathbf{3}_{31}$, each containing 32 words from $\mathbf{3}_{0,0}$ to $\mathbf{3}_{0,31}$ . . . $\mathbf{3}_{31,0}$ to $\mathbf{3}_{31,31}$, and also comprises input series-parallel conversion devices $\mathbf{4}_0$ to $\mathbf{4}_{31}$, output parallel-series conversion devices $\mathbf{5}_0$ to $\mathbf{5}_{31}$, groups of AND-gates (each group comprises eight gates) $\mathbf{6}_{0,0}$ to $\mathbf{6}_{0,31}$ . . . $\mathbf{6}_{31,0}$ to $\mathbf{6}_{31,31}$ controlling the write-in in the buffer store and $\mathbf{7}_0$ to $\mathbf{7}_{31}$ controlling transmission to the outgoing registers and $\mathbf{10}_{0,0}$ to $\mathbf{10}_{0,31}$ . . . $\mathbf{10}_{31,0}$ to $\mathbf{10}_{31,31}$ controlling the read-out in the buffer store. Each of the sections $\mathbf{3}_0$ to $\mathbf{3}_{31}$ of buffer store 3 corresponds to an incoming multiplex circuit, section $\mathbf{3}_k$ corresponds to the incoming multiplex circuit $\mathbf{1}_k$ and each word in a section corresponds to a time slot in the multiplex circuit corresponding to the section, the word $\mathbf{3}_{k,i}$ corresponding to the time slot $t_i$ of the multiplex circuit $\mathbf{1}_k$.

Each time slot $t_i$ is divided into 33 intervals $\tau_{i,-}$, $\tau_{i,0}$, $\tau_{i,1}$, . . . $\tau_{i,31}$, wherein the first $\tau_{i,-1}$ is used to write the contents of the 32 slots $t_{i,-1}$ in the incoming multiplex circuits simultaneously in the 32 sections of the buffer store, in the words $\mathbf{3}_{0,i-1}$ to $\mathbf{3}_{31,\ 1-1}$, the 32 other intervals $\tau_{i,0}$ to $\tau_{i,31}$ being used for reading-out the 32 words of the buffer store which are to be transmitted during the time slot $t_{i+1}$ to the 32 outgoing multiplex circuits respectively.

During $\tau_{i,-1}$, the time base 8 simultaneously opens the AND gate groups $\mathbf{6}_{0,i-1}$, $\mathbf{6}_{k,i-1}$ . . . $\mathbf{6}_{31,i-1}$.

During $\tau_{j,m}$, the time base 8 opens the AND gate group $\mathbf{7}_m$.

In order to connect time slot $i$ of incoming multiplex circuit $k$ to time slot $j$ of outgoing multiplex circuit $m$, it is necessary and sufficient for the buffer word read at each frame during the reading-out time interval $\tau_{j-1,m}$ to be the word $\mathbf{3}_{k,i}$ written-in during the preceding writing-in time interval $\tau i_+\mathbf{1}_{,-}\mathbf{1}$. To this end, the marker circuit 11 writes the information $(k,i)$ in the word $\mathbf{9}_{j-1,m}$ in the control store 9. At each interval $\tau_{j-1,m}$, the time base 8 reads-out the word $\mathbf{9}_{j-1,m}$ which, after being decoded, opens the AND gate groups $\mathbf{10}_{k,1}$. The marker circuit 11 breaks the connection by erasing the word $\mathbf{9}_{j-1,m}$ from the control store. Each time slot $j$ of each outgoing multiplex circuit $m$ is permanently associated with a word $\mathbf{9}_{j-1,m}$, having 10 bits in the control store. A bidirectional connection is obtained by making two unidirectional connections, i.e. $(i,k)$ towards $(j,m)$ and $(j,m\ )$ towards $(i,k)$.

As can be seen, the buffer store 3 has 32 writing times and 1024 reading times per 125 $\mu s$ frame, corresponding to a rhythm of approximately $8.5\times10^6$ operations per second, a value which is quite near the existing technological limits in industry. The result is that the possible capacity of the aforementioned structure is limited to about 1,000 incoming and outgoing time slots that is to approximately 32 incoming and 32 outgoing multiplex circuits as assumed in FIG. 1.

In the system described, each time slot of each incoming multiplex circuit is associated with a word in the buffer store, and each time slot of each outgoing multiplex circuit is associated with a word in the control store. Association can be made in another way consisting in associating the incoming slots with the control store and the outgoing slots with the buffer store.

Figure 2:
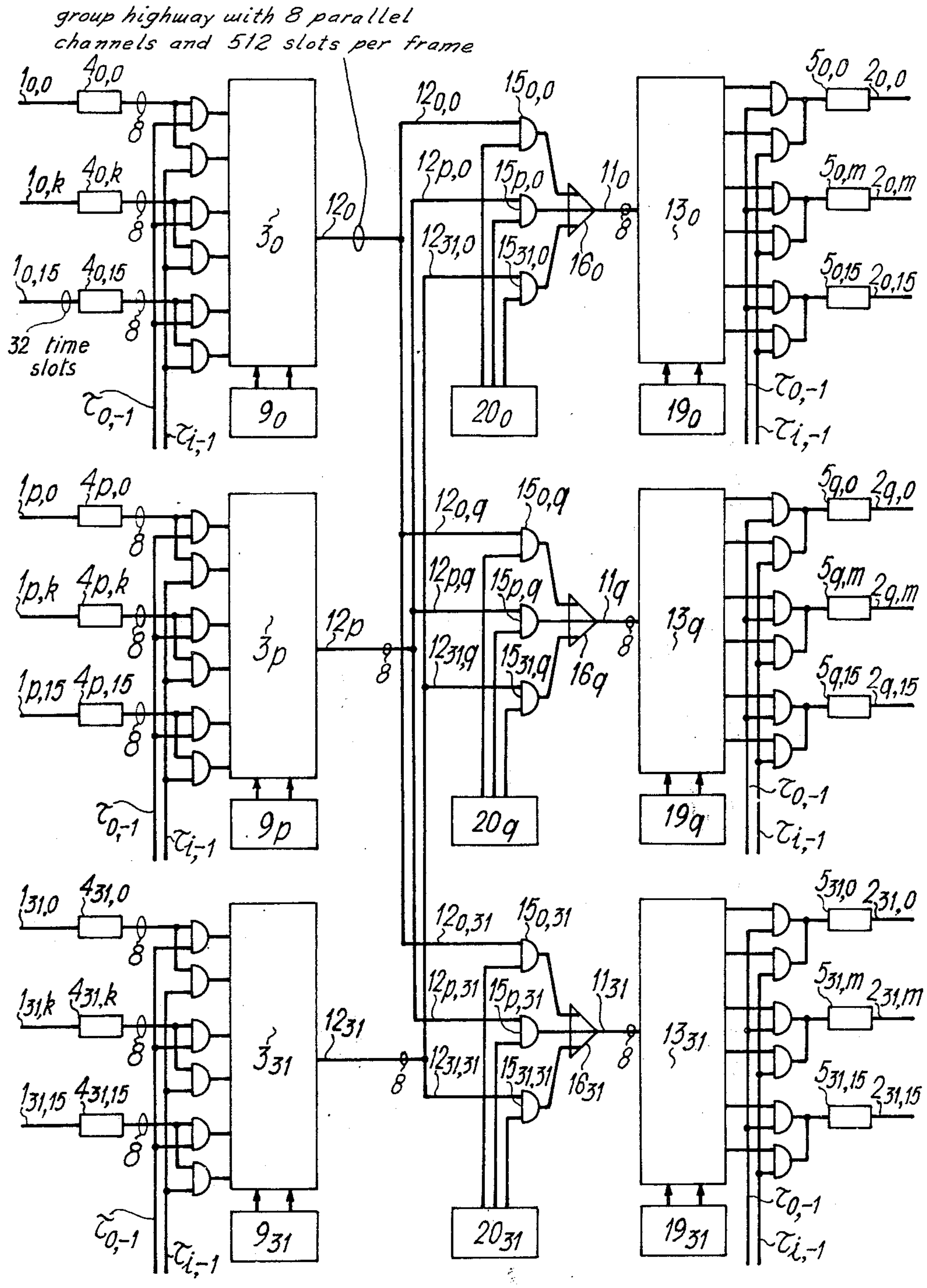
FIG.2 PRIOR ART
FIG. 2 represents a known time-space-time type-division switching system.

FIG. 2 shows a time-space-time type 3-stage time-division switching system of the prior art. The first stage comprises output-controlled time-division switching networks, the second stage comprises a multiplex space-division switching network and the third stage comprises input-controlled time-division switching networks.

The switching system is connected to 512 incoming multiplex circuits divided into 32 groups of 16, $\mathbf{1}_{0,0}$ to $\mathbf{1}_{0,15}$ . . . $\mathbf{1}_{p,0}$ to $\mathbf{1}_{p,15}$ . . . $\mathbf{1}_{31,0}$ to $\mathbf{1}_{31,15}$ and to 512 outgoing multiplex circuits divided into 32 groups of 16, $\mathbf{2}_{0,0}$ to $\mathbf{2}_{0,15}$ . . . $\mathbf{2}_{q,0}$ to $\mathbf{2}_{q,15}$ . . . $\mathbf{2}_{31,0}$ to $\mathbf{2}_{31,15}$.

Each group of 16 incoming multiplex circuits is connected to a 512-word incoming buffer store, i.e. $\mathbf{3}_0$ for the group $\mathbf{1}_{0,0}$ to $\mathbf{1}_{0,15}$ . . . $\mathbf{3}_p$ for the group $\mathbf{1}_{p,0}$ to $\mathbf{1}_{p,15}$ . . . $\mathbf{3}_{31}$ for the group $\mathbf{1}_{31,0}$ to $\mathbf{1}_{31,15}$. Each group of 16 outgoing multiplex circuits is connected to a 512-word outgoing buffer store, i.e. $\mathbf{13}_0$ for the group $\mathbf{2}_{0,0}$ to $\mathbf{2}_{0,15}$, $\mathbf{13}_q$ for the group $\mathbf{2}_{q,0}$ to $\mathbf{2}_{q,15}$ . . . $\mathbf{13}_{31}$ for the group $\mathbf{2}_{31,0}$ to $\mathbf{2}_{31,15}$.

From each incoming buffer store, there extends an incoming group highway $\mathbf{12}_0$ . . . $\mathbf{12}_p$ . . . $\mathbf{12}_{31}$ respectively (each group highway comprises 8 channels in the slots of equal rank in which the bits of a single octet are in parallel), and each outgoing buffer store receives an outgoing group highway $\mathbf{11}_0$ . . . $\mathbf{11}_q$ . . . $\mathbf{11}_{31}$ respectively. Each incoming group highway $\mathbf{12}_p$ is multipled on to 32 AND gate groups $\mathbf{15}_{p,0}$ . . . $\mathbf{15}_{p,q}$ . . . $\mathbf{15}_{p,31}$, and the outputs of each assembly of 32 AND gate groups $\mathbf{15}_{0,q}$ . . . $\mathbf{15}_{p,q}$ . . . $\mathbf{15}_{31,q}$ are regrouped into a group of OR gates $\mathbf{16}_q$ connected to the 8 channels of the outgoing group highway $\mathbf{11}_q$.

Below each incoming buffer store $\mathbf{3}_0$ to $\mathbf{3}_{31}$ and below each outgoing buffer store $\mathbf{13}_0$ to $\mathbf{13}_{31}$, we have shown an associated control store, i.e. $\mathbf{9}_0$ to $\mathbf{9}_{31}$ with regard to the incoming buffer stores and $\mathbf{19}_0$ to $\mathbf{19}_{31}$ with regard to the outgoing buffer stores. The multiplex space-division switching network is made up of the 8 assemblies of gates 15 and 16, and of control store 20 controlling AND gates 15.

The operation is as follows: suppose that the time slot $i$ (among 32) of the incoming multiplex circuit $k$ (among 16) connected to the incoming time-division switching network $p$ (among 32) has to be connected to the time slot $j$ (among 32) of the outgoing multiplex circuit $m$ (among 16) connected to the outgoing time-division switching network $q$(among 32). At each frame and during the slot $i$ of the frame, the incoming word is stored in the incoming control store $\mathbf{3}_{p,k,i}$; at each frame, the word in the outgoing buffer store $\mathbf{13}_{q,m,j}$ is transmitted in the required time slot $j$. A connection will be made if, at each frame, the contents of the words $\mathbf{3}_{p,k,i}$ can be transferred into the word $\mathbf{13}_{q,m,j}$ via the incoming group highway $\mathbf{12}_p$. the AND gate group $\mathbf{15}_{p,q}$, the other gates $\mathbf{15}_{r,q}(r \neq p)$ being closed at this instant, the OR gate group $\mathbf{16}_q$ and the outgoing group highway $\mathbf{11}_q$. This transfer can be made at any time slot in any of the group highways and multiplex space-division switching network provided there is no interference with connections already made in the system. The time slot is selected by a control logic outside the switching system which has been described.

In the system in FIG. 1, it is always possible to connect two free time slots, but this is not so in the system in FIG. 2. In order to connect an incoming time slot $(p,k,i)$ to an outgoing time slot $(q,m,j)$, at least one time interval must be free simultaneously on the incoming group highway associated with the input time-division switching network for $(p,k,i)$ and on the outgoing group highway associated with the output time-division switching network for $(q,m,j)$. The problem is similar if allowance is made for delays in propagation between the incoming and outgoing time-division stages.

Figure 3:
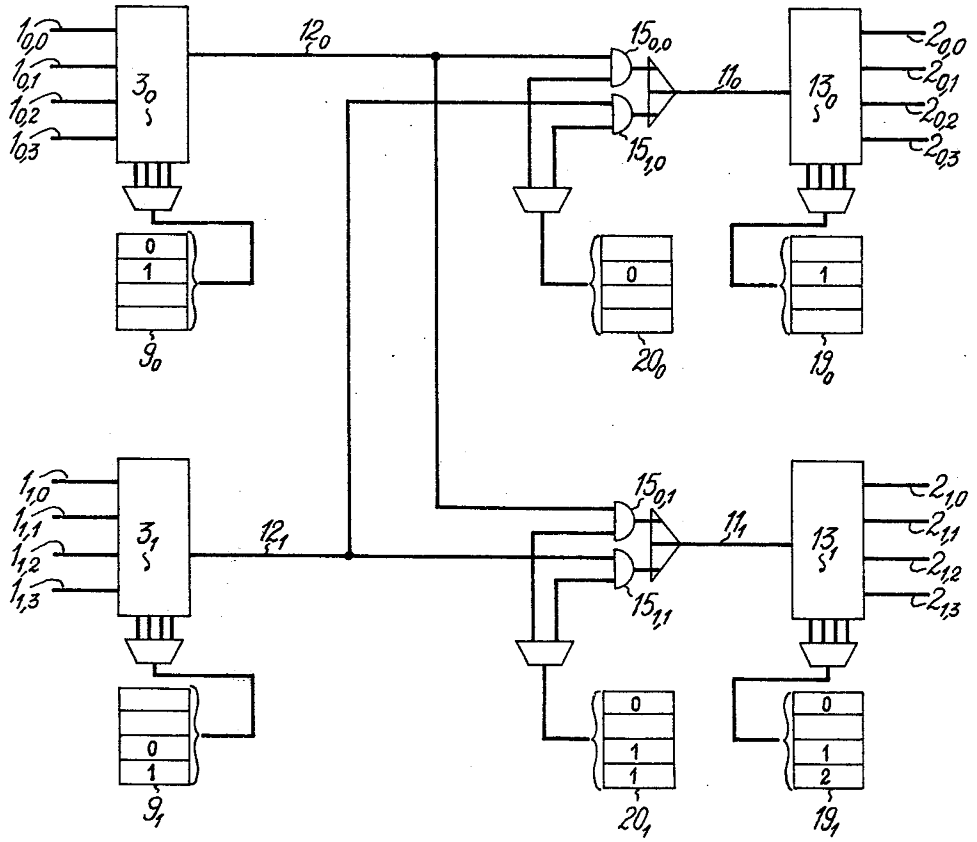
FIG.3 PRIOR ART
FIG. 3 is a simplified example of a switching system of the kind shown in FIG. 2.

In order to show the possibility of a blocking in the case of square time switching networks (we shall also show there is no blocking in the system if the rearrangement is accepted), we have shown in FIG. 3 a system comprising two groups of four circuits, each having a single time slot, i.e. $0 \leq p \leq 1$, $0 \leq q \leq 1$, $0 \leq k \leq 3$, $0 \leq m \leq 3$. The reference numbers are the same as in FIG. 2. The group highways $\mathbf{12}_0$, $\mathbf{12}_1$, $\mathbf{11}_0$, $\mathbf{11}_1$ have four time intervals $\tau$. Each incoming buffer store $\mathbf{3}_0$, $\mathbf{3}_1$ and each outgoing buffer store $\mathbf{13}_0$, $\mathbf{13}_1$ comprises four words, one per circuit; each control store $\mathbf{9}_0$, $\mathbf{9}_1$, $\mathbf{19}_0$, $\mathbf{19}_1$, $\mathbf{20}_0$, $\mathbf{20}_1$ comprises four words, one per time interval $\tau$ of the multiplex space switching network. The words in 9 and 19 comprise 2 bits, for the purpose of addressing the buffer stores 3, 13 respectively; the words in 20 comprise 1 bit, so as to address the group highway $\mathbf{12}_0$ or the group highway $\mathbf{12}_1$. For the present, we shall disregard problems relating to the inoperative state. We see that:

$\mathbf{1}_{0,0}$ is connected to $\mathbf{2}_{1,0}$ via $\mathbf{15}_{0,1}$ at $\tau$ 0
$\mathbf{1}_{0,1}$ is connected to $\mathbf{2}_{0,1}$ via $\mathbf{15}_{0,0}$ at $\tau$ 1
$\mathbf{1}_{1,0}$ is connected to $\mathbf{2}_{1,1}$ via $\mathbf{15}_{1,1}$ at $\tau$ 2
$\mathbf{1}_{1,1}$ is connected to $\mathbf{2}_{1,2}$ via $\mathbf{15}_{1,1}$ at $\tau$ 3

As can be seen, it is impossible e.g. to connect $\mathbf{1}_{0,2}$ to $\mathbf{2}_{1,3}$, since there is no transfer time interval $\tau$ available simultaneously on group highways $\mathbf{12}_0$ and $\mathbf{11}_1$: there is an internal blocking.

FOLDING OF THE TIME STAGES (FIG. 4)

In conjunction with FIG. 2, we have described how a time slot $i$ in an incoming multiplex circuit $\mathbf{1}_{p,k}$, i.e. the slot $(p,k,i)$ is connected to a time slot $j$ in an outgoing miltiplex circuit $\mathbf{2}_{q,m}$, i.e. to the slot $(q,m,j)$. Henceforward, we shall consider only the case where transmission is bidirectional between two subscribers, one of whom is allocated the time slot $i$ of an incoming multiplex circuit $\mathbf{1}_{p,k}$ and of the associated outgoing multiplex circuit $\mathbf{2}_{p,k}$, and the other of whom is allocated the time slot $j$ of an incoming multiplex circuit $\mathbf{1}_{q,m}$ and of the associated outgoing multiplex circuit $\mathbf{2}_{q,m}$. Consequently, any connection of $\mathbf{1}_{p,k,i}$ to $\mathbf{2}_{q,m,j}$ is systematically accompanied by the connection of $\mathbf{1}_{q,m,j}$ to $\mathbf{2}_{p,k,i}$. A bidirectional connection is obtained by using two time intervals $\tau_1$ and $\tau_2$ of the multiplex space-division switching network, one for transferring the incoming buffer word $\mathbf{3}_{p,k,i}$ into the outgoing buffer word $\mathbf{13}_{q,m,j}$ and the other being for transferring the incoming buffer word $\mathbf{3}_{q,m,j}$ into the outgoing buffer word $\mathbf{13}_{p,k,i}$. For establishing such a connection, the control logic must find the following simultaneously:

interval $\tau_1$ free on $\mathbf{12}_p$ and $\mathbf{11}_q$
interval $\tau_2$ free on $\mathbf{12}_q$ and $\mathbf{11}_p$ If the control logic is made such that each couple $(\tau_1, \tau_2)$ relating to a single connection comply with a relationship such that:

$$f(\tau_1) = \tau_2 \neq \tau_1$$
$$f(\tau_2) = \tau_1 \neq \tau_2$$

(such a relationship is symmetrical with respect to the firstbissectrix $\tau_1 = \tau_2$) then, as each time inverval $\tau$ occupied by a connection on any incoming group highway $\mathbf{12}_p$ there is a corresponding time interval $f(\tau)$ engaged for the other transmission direction of the same bidirectional connection on the associated outgoing group highway $11_p$; any idle time interval $\tau$ at any incoming group highway $12_p$ corresponds to an idle time interval $f(\tau)$ on the associated outgoing group highway $11_p$.

Consequently, when the control logic is searching for idle transfer instants as they appear in order to establish a bidirectional connection, the two conditions to be respected reduce to a single condition, i.e. $\tau$ must be idle on $12_p$ and $f(\tau)$ must be idle on $12_q$.

Thus the following free advantages are provided.

1. The control store logic showing which time intervals of the group highways are idle or engaged is reduced by half and represents for example the idle intervals on the incoming group highways alone. In the required algorithm, it is not directly necessary to know what time intervals are idle or engaged in the outgoing group highways, since this could easily be calculated by the operation $f$.

2. The time taken to search for a route is reduced by at least a half.

3. The probability of blocking in the establishment of a bidirectional connection is reduced, i.e. is substantially halved when the probability is low.

It can be seen that if, at the instant $\tau$, the control store $9_p$ supplies the incoming buffer store $3_p$ with a word having the address $\tau$and the contents $(k,i)$, the control store $19_p$ should, at the instant $f(\tau)$, supply the outgoing upper store $13_p$ with a word having the address $f(\tau)$ and the contents $(k,i)$. The invention uses this redundance in order to omit the control store 19, by using the control stores 9 to supply the write-in addresses to the outgoing buffer stores 13. The successive addresses of these words in the control store 9 have the values $f(0)$, $f(1), \ldots f(\tau) \ldots f(511)$.

Any function $f$ such as defined can be used. The most useful function may depend on the required amount of hardware components. For example, we can take the function: $f(\tau) = (\tau + 256)$ modulo 512, in a system having 512 transfer time intervals.

Figure 4:
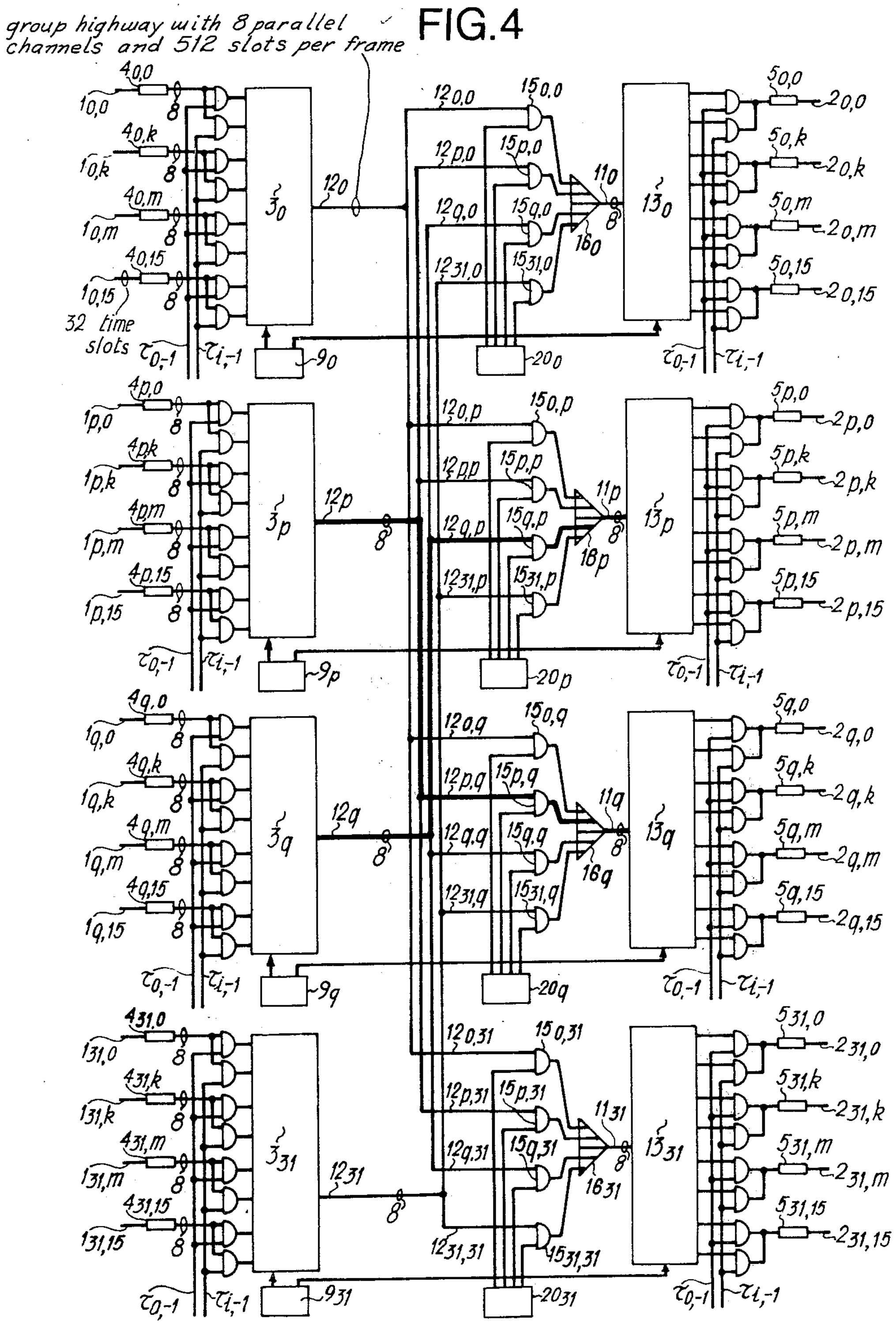
FIG. 4 shows a time-space-time type time-division switching system wherein the two time-division stages are controlled by a single control unit.

In the system of FIG. 4, the control stores 9 are of the "addressable" type and, in order to slow down the operating rhythm, each word $(k,i)$ or $(m,j)$ is read only once per frame out of the control store, for both uses thereof. The following function has been selected:

$$f(n) = 2n + 1$$
$$f(2n+1) = 2n$$

The control store 9 is divided into two groups or partial stores 90 and 91 (FIGS. *5a, 5b*). Addresses are supplied to the incoming buffer store 3 in the natural order 0, 1, 2, . . . 511 and addresses are supplied to the outgoing buffer store 13 in the order 1, 0, 3, 2, . . . 511, 510 (resulting from the natural order by inversion of the two addresses forming pairs of successive addresses).

During the interval $\tau_{2n}$, the word having the address $2n$ and the contents $(k,i)$ in the partial control store $90_p$ (FIG. *5a*) is sent to the buffer store $3_p$ and causes the word $3_{p,k,i}$ to be read out and transmitted. During the same interval $\tau_{2n}$, the word having the address $(2n+1)$ and the contents $(m,j)$ in the partial control store $91_q$ is sent to the buffer store $13_q$ so that the word $3_{p,k,i}$ can be written into word $13_{q,m,j}$ after travelling into the space-division stage via AND gate $15_{p,q}$.

During the interval $\tau_{(2n+1)}$, the word having the address $(2n+1)$ and the contents $(m,j)$ in the partial control store $91_q$ is sent to the buffer store $3_q$ and forces the word $3_{q,m,j}$ to be read out and transmitted. During the same interval $\tau_{(2n+1)}$, the word having the address $2n$ and the contents $(k,i)$ in the partial control store $90_p$ is sent to the buffer store $13_p$ so that the word $3_{q,m,j}$ can be written in the word $13_{p,k,i}$ after travelling into the space-division stage via AND gate $15_{q,p}$.

It can be seen that, during even time intervals, the partial control stores 90 address the incoming buffer stores 3 and the partial control stores 91 address the outgoing buffer stores 13; during odd time intervals, the partial control stores 90 address the outgoing buffer stores 13 and the partial stores 91 address the incoming buffer stores 3.

In practice, allowance has been made for the time required for propagating data between the incoming buffer store 3 and the outgoing buffer store 13.

The resulting "folding" of the control for the time-division stages can also be obtained using a switching system wherein the incoming time-division stage is input-controlled and the outgoing time-division stage is output-controlled.

In the example described, the gain resulting from the omission of the control stores 19 represents 16,384 words of 9 bits, i.e. 147,456 bits, for a system comprising 512 miltiplex circuits having 32 time slots.

DEMULTIPLEXING AND SERIALIZATION OF THE SPACE-DIVISION STAGE (FIGS. 6 and 7)

The incoming 12 and outgoing 11 group highways in FIG. 4 each comprise 8 individual multplex connections in parallel, each having 512 time intervals per frame of 125 μs. Consequently the duration of each time interval is (125/512) μs = 250 ns approx., corresponding to a flow rate of 4 Megabits per second, for each connection. This makes synchronization difficult at the multiplex space-division switching network, in view of the size of the assembly.

In practice, the procedure is different. Each individual group highway is demultiplexed into 8 group sub-highways each having 64 time intervals. Each individual incoming interval group highway $12_p$ leaving the incoming buffer store $3_p$ is demultiplexed into 8 parallel group sub-highways $112_{p,0}$ to $112_{p,7}$ each having 64 time intervals. Each group sub-highway $112_{p,r}$ is serialized in a parallel-series converter unit $23_{p,r}$ to form a serial group sub-highway $212_{p,r}$. In practice, the parallel group sub-highway $112_{p,r}$ is imaginary, since the same device is used for demultiplexing and parallel-series conversion. The group highway $12_p$ distributes data alternatively to the different serial group sub-highways $212_{p,0}$ to $212_{p,7}$; the time intervals $s$ of serial group sub-highway $212_{p,r}$ corresponds to the time interval $\tau_{(8s+r)}$ of group highway $12p$. For example, the contents of time slot No. 227 in the eight parallel channels of group highway $12p$ are transferred into the 28th slot of serial group sub-highway $212_{p,3}$ since $$227 = 8\,s + r = 8 \times 28 + 3$$

which gives $$s = 28;\ r = 3$$

Similarly, each outgoing group highway $11_q$ entering the outgoing buffer memory $13_q$ is obtained by the series-parallel conversion and multiplexing of 8 outgoing serial group sub-highway $211_{q,0}$ to $211_{q,7}$ each having 64 times intervals.

In other words, let us designate the words by *a b c d e f g h* with a subscript which is the number of the time intervals from 0 to 511. On group highway $12_p$ which comprises eight parallel individual channels, the words are transmitted in parallel form:

| | | | | | | | | |
|---|---|---|---|---|---|---|---|---|
| $\tau_o$ | $a_o$ | $b_o$ | $c_o$ | $d_o$ | $e_o$ | $f_o$ | $g_o$ | $h_o$ |
| $\tau_1$ | $a_1$ | $b_1$ | $c_1$ | $d_1$ | $e_1$ | $f_1$ | $g_1$ | $h_1$ |
| $\tau_{511}$ | $a_{511}$ | $b_{511}$ | $c_{511}$ | $d_{511}$ | $e_{511}$ | $f_{511}$ | $g_{511}$ | $h_{511}$ |

During demultiplexing, the bits $a_o \quad a_8 \quad a_{16} \ldots a_{504}$ are applied to the first channel of group sub-highway $\mathbf{112}_{p,o}$; the bits $b_o \quad b_8 \quad b_{16} \ldots b_{504}$ are applied to the second channel of group sub-highway $\mathbf{112}_{p,o}$ and the bits $h_o \quad h_8 \quad h_{16} \ldots h_{504}$ are applied to the eighth channel of group sub-highway $\mathbf{112}_{p,o}$.

During serializing, the bits $a_o\, b_o \ldots h_o, a_8\, b_8 \ldots h_8, \ldots a_{504}\, b_{504} \ldots h_{504}$ are applied to serial group sub-highway $\mathbf{212}_{p,o}$.

Thus, the word are now transmitted in series, the serial group sub-highway $\mathbf{212}_{p,o}$ transmitting the words whose subscripts are multiples of 8 and serial group sub-highway $\mathbf{212}_{p,7}$ transmitting the words whose subscripts are multiples of 8 plus 7.

It can be seen that, owing to the demultiplexing and remultiplexing of the group highways, the outgoing time-division stage can be controlled with the words of the control store 9 in the natural order, i.e. in the same order in which they arrive at the incoming buffer store 3; to this end, it is merely necessary for the incoming group highways 12 to be demultiplexed in the order 0, 1, 2, 3, 4, 5, 6, 7 and for the outgoing serial group sub-highways 211 to be multiplexed in the order 1, 0, 3, 2, 5, 4, 7, 6. In the system described, the connections joining the two partial control stores $\mathbf{90}_p$, $\mathbf{91}_p$ to the buffer stores are multiplexed in the even-odd order at the address input of the incoming buffer stores $\mathbf{3}_p$ and in the odd-even order at the address input of the outgoing buffer stores $\mathbf{13}_p$. The outgoing serial group sub-highways 211 are multiplexed in the natural order. The addresses have been crossed instead of crossing the data.

In FIG. 6, the control store 9 sends the same address to the incoming buffer store 3 and to the outgoing buffer store 13, the address being conveyed to the latter store via a circuit producing a delay of 1/512th of a frame, and designated by 1R.

Incoming group highways such as $\mathbf{12}_p$ are demultiplexed into incoming sub-junctions $\mathbf{112}_{p,0}$ to $\mathbf{112}_{p,7}$ in the natural order, i.e. 0, 1, 2, . . . 7, by sequentially opening gates $\mathbf{312}_{p,0}$ to $\mathbf{312}_{p,7}$. On the other hand, the outgoing sub-junctions $\mathbf{111}_{p,0}$ to $\mathbf{111}_{p,7}$ are remultiplexed into an outgoing junction $\mathbf{11}_p$ in the order 6, 1, 0, 3, 2, 5, 4, 7, by sequentially opening the gates $\mathbf{311}_{p,6}$, $\mathbf{311}_{p,1}$, $\mathbf{311}_{p,0}$, $\mathbf{311}_{p,3}$, $\mathbf{311}_{p,2}$, $\mathbf{311}_{p,5}$, $\mathbf{311}_{p,4}$, $\mathbf{311}_{p,7}$.

The even-number sub-junctions contain circuits producing a delay of 2/512th of a frame, and designated by 2R.

At the instant $\tau_{8n}$, for example, the word having the address $8n$ in control store $\mathbf{9}_p$ is sent to the buffer store $\mathbf{3}_p$ and causes the word $\mathbf{3}_{p,k,i}$ to be transmitted at the group sub-highway $\mathbf{112}_{p,0}$. At the instant $\tau_{8n+1}$, the word having the address $8n$ in control store $\mathbf{9}_p$ reaches the store $\mathbf{13}_p$. On the other hand, the word having the address $(8n+1)$ in control store $\mathbf{9}_q$ is sent to the buffer store $\mathbf{3}_q$ so that the word $\mathbf{3}_{q,m,j}$ is transmitted on group highway $\mathbf{112}_{q,1}$. After being switched in the space-division stage, the word $\mathbf{3}_{q,m,j}$ reaches the store $\mathbf{13}_p$, and is therefore stored in the word $\mathbf{13}_{p,k,i}$ in the last mentioned store.

At the instant $\tau_{8n+2}$, the word having the address $8_{n+1}$ in control store $\mathbf{9}_q$ reaches the store $\mathbf{13}_q$. At the same time, the word $\mathbf{3}_{p,k,i}$ which left store $\mathbf{3}_p$ at instant $\tau_{8n}$ after being switched in the space-division stage and delayed by 2/512th of a frame, reaches store $\mathbf{13}_q$, and is therefore stored in the word $\mathbf{13}_{q,m,j}$ of the last mentioned store.

In the above explanation, we have disregarded the propagation time of the words in the group sub-highways.

The incoming and outgoing series group sub-highways 212, 211 are used at the rate of 6 Megabits per second for an effective flow rate of 4 Megabits per second. A time interval in a serial group sub-highway comprises eight time intervals of 167 ns that is $8\times167 = 1333$ ns used for transmitting the 8 bits of a word, and four time intervals providing a margin of 666 ns for allowing a resynchronization device (not shown) at the receiving end of each serial group sub-highway to be operated.

The space-division switching network in FIG. 4 comprises 8 assemblies of 32 AND-OR gates (15, 16) having 32 times two inputs, each assembly corresponding to the weight of a bit in the words to be transmitted; the switching network also comprises an assembly of 32 control stores 20, each store being connected to a part of the eight gate assemblies.

The multiplex space division switch in FIG. 7 comprises 8 identical independent multiplex space division sub-switches each comprising 32 AND-OR gates having 32 times two inputs (115, 16) and 32 control stores 120, each having 64 words. Each subswitch operates at 64 slots per frame, each slot corresponding to the transmission of 8 bits in series, and is connected to the incoming serial group sub-highways 212 and to the outgoing serial group sub-highways 211 having the same rank as its own rank.

The multiplex space division switch in FIG. 7 uses the same amount of routing and storage equipment as the switch in FIG. 4. The two transmission directions of a connection extend respectively through two multiplex space division sub-switches forming a pair, e.g. 0 and 1, or 2 and 3, or 4 and 5, or 6 and 7, at the same time interval out of 64. An advantage of the last mentioned system is that a breakdown in one pair of multiplex space division sub-switches does not stop the entire system. Three quarters of the transfer possibilities between store 3 and store 13 remain, so that a partial service is possible.

FOLDING-BACK OF THE MULTIPLEX SPACE DIVISION STAGE (FIGS. 8 and 9)

We now return to the example of a bidirectional connection between two subscribers, one of whom is allotted the time slot $\underline{i}$ of an incoming multiplex circuit $\mathbf{1}_{p,k}$ and associated outgoing multiplex circuit $\mathbf{2}_{p,k}$ and the other of whom is allocated the time slot $\underline{j}$ of an incoming multiplex circuit $\mathbf{1}_{q,m}$ and the associated outgoing multiplex circuit $\mathbf{2}_{q,m}$, the incoming buffer word $\mathbf{3}_{p,k,i}$ being transferred to the outgoing buffer word $\mathbf{13}_{q,m,j}$ by the multiplex space division sub-switch of rank $r$ in the time interval $s$, and the incoming buffer word $\mathbf{3}_{q,m,j}$ being transferred to the outgoing buffer word $\mathbf{13}_{p,k,i}$ by the multiplex space dividion sub-switch of rank $r'$ associated with $r$, in the time interval $s$. We have:

$$\tau_1 = 8\,s + r (0 \leq r \leq 7)$$
$$\tau_2 = 8\,s + r'\ (0 \leq r' \leq 7)$$

where $r = 2n$ and $r' = 2n + 1$ or vice versa.

In accordance with FIG. 7, during the time interval $s$, AND gate $\mathbf{115}_{p,r,q}$ is the only one of the gates $\mathbf{115}_{0,r,q}$ to $\mathbf{115}_{31,r,q}$ to be opened, and is selected from among these 32 gates by the control store word $\mathbf{120}_{q,r,s}$ having the contents $p$.

During the same time interval $\underline{s}$, the AND gate $\mathbf{115}_{q,r',p}$ used for the other transmission direction, is the only one of the gates $\mathbf{115}_{0,r',p}$ to $\mathbf{115}_{31,r',p}$ to be open, and is selected from among these 32 gates by the control store word $\mathbf{120}_{p,r',s}$ having the contents $\underline{q}$. However, AND gate $\mathbf{115}_{q,r',p}$ is also the only one of the gates $\mathbf{115}_{q,r',0}$ to $\mathbf{115}_{q,r',31}$ to be open during the interval $s$. Otherwise, one of the two subscribers could converse with a third correspondent.

Starting from the system in FIG. 7, we shall make no change e.g. in the multiplex space division sub-switches of even ranks 0,2,4,6. In the case of the other multiplex space division sub-switches of odd ranks 1, 3, 5, 7, the AND gates are grouped in assemblies $\mathbf{115}_{q,r',0}$ to $\mathbf{115}_{q,r',31}$ associated with a store $\mathbf{220}_{q,r'}$ (FIG. 8) instead of being grouped in assemblies $\mathbf{115}_{0,r',p}$ to $\mathbf{115}_{31,r',p}$ associated with a control store $\mathbf{120}_{p,r'}$. In the case of the connection as described, the AND gate $\mathbf{115}_{q,r',p}$ is the only one of the gates $\mathbf{115}_{q,r',0}$ to $\mathbf{115}_{q,r,31}$ which is opened during the time interval $s$ by the control store word $\mathbf{220}_{q,r',s}$ having the contents $p$; store $\mathbf{220}_{q,r'}$ may be replaced by store $\mathbf{120}_{p,r'}$, which thus becomes common to two associated multiplex space division sub-switches and is given the number 320 in FIG. 9. The even-rank multiplex space division sub-switches are output-controlled (AND gates 115), whereas the odd-rank multiplex space division sub-switches are input-controlled (AND gates 215).

The resulting saving is equal to half the space-stage control store, i.e. 8,192 words of 5 bits which makes 40,960 bits.

In the description no account has been taken of the various delay circuits used to compensate the propagation times,

What we claim is:

1. A time division switching system of the time-space-time division type comprising:

a plurality of incoming time division switching networks;

a plurality of outgoing time division switching networks;

a plurality of incoming time division multiplex circuits divided into identical incoming multiplex circuit groups respectively connected to the inputs of said incoming time division switching networks, each of said incoming multiplex circuits defining incoming multiplex circuit time slots;

a plurality of outgoing time division multiplex circuits divided into identical outgoing multiplex circuit groups respectively connected to the outputs of said outgoing time division switching networks, each of said outgoing multiplex circuits defining outgoing multiplex circuit time slots;

said incoming and outgoing time slots having a given duration and conveying P.C.M. words having a given number of bits;

incoming time division group highways connected to the outputs of said incoming time division switching networks:

outgoing time division group highways connected to the inputs of said outgoing time division switching networks;

said incoming and outgoing group highways respectively defining incoming group highway time slots and outgoing group highway time slots conveying said P.C.M. words;

an incoming buffer store in each of said incoming time division switching networks adapted for having stored therein P.C.M. words;

means for cyclically transferring the P.C.M. words conveyed by said incoming multiplex circuit time slots into words of said incoming buffer stores permanently associated with said incoming multiplex circuit time slots;

an outgoing buffer store in each of said outgoing time division switching networks adapted for having stored therein P.C.M. words;

means for cyclically transferring the P.C.M. words stored in said outgoing buffer stores into outgoing multiplex circuit time slots permanently associated with said outgoing buffer store words;

a space division switching network having inputs and outputs respectively connected to said incoming and outgoing time division group highways and including gate means for selectively connecting the concomitant time slots in each incoming and each outgoing group highway; and a single control store means for, during a first time slot, transferring a first P.C.M. word stored in a word of a first incoming buffer store permanently associated with a first incoming multiplex circuit time slot into a time slot of a first incoming group highway, enabling the gate means connecting said first incoming group highway time slot to a first outgoing group highway time slot and transferring the first P.C.M. word conveyed in said first outgoing group highway time slot into a word of a first outgoing buffer store permanently associated with a first outgoing multiplex circuit time slot and, in a second time slot following said first time slot, transferring a second P.C.M. word stored in a word of a second incoming buffer store permanently associated with a second incoming multiplex circuit time slot into a time slot of a second incoming group highway, enabling the gate means connecting said second incoming group highway time slot to a second outgoing group highway time slot and transferring the second P.C.M. word conveyed in said second outgoing group highway time slot into a word of a second outgoing buffer store permanently associated with a second outgoing multiplex circuit time slot.

2. A time division switching system of the time-space-time division type according to claim 2, in which the incoming time division group highways and the outgoing time division group highways both are formed by a number of parallel multiplex channels equal to the number of bits of the P.C.M. words, the concomitant time-slots of said parallel multiplex channels each conveying in parallel one bit of said P.C.M. words.

3. A time division switching system of the time-space-time division type according to claim 2, in which the incoming time division group highways and the outgoing time division group highways both are formed by a number $n$ of parallel multiplex channels each having N time-slots, $n$ being the number of bits of the P.C.M. words and N being a multiple of $n$, the N time-slots of the first parallel multiplex channel conveying the P.C.M. words of respective ranks 0, $n$, $2n$, . . . the N time-slots of the second parallel multiplex channel, the P.C.M. words of respective ranks 1, $(n+1)$, $(2n+1)$, . . . and the N time slots of the $n^{th}$ parallel multiplex channel conveying the P.C.M. words of respective ranks $(n-1)$, $(2n-1)$, $(3n-1)$, . . . .

4. A time division switching system of the time-space-time division type comprising:

a plurality of incoming time division switching networks;

a plurality of outgoing time division switching networks;

a plurality of incoming time division multiplex circuits divided into identical incoming multiplex circuit groups respectively connected to the inputs of said incoming time division switching networks, each of said incoming multiplex circuits defining incoming multiplex circuit time slots;

a plurality of outgoing time division multiplex circuits divided into identical outgoing multiplex circuit groups respectively connected to the outputs of said outgoing time division switching networks, each of said outgoing multiplex circuits defining outgoing multiplex circuit time slots;

said incoming and outgoing time slots having a given duration and conveying P.C.M. words having a given number of bits;

parallel incoming time division group highways connected to the outputs of said incoming time division switching networks;

parallel outgoing time division group highways connected to the inputs of said outgoing time division switching networks;

said incoming and outgoing group highways being formed of a number of parallel multiplex channels equal to the number of the P.C.M. word bits;

serial incoming time division group highways;

serial outgoing time division group highways said serial incoming and outgoing group highways being formed of a number of serial multiplex channels equal to the number of the P.C.M. word bits;

serializer means inserted between said parallel incoming multiplex channels and said serial incoming multiplex channels for converting parallel P.C.M. words having their bits in parallel in concomitant time slots of the parallel incoming multiplex channels into serial P.C.M. words having their bits in series in consecutive time slots of the serial incoming multiplex channels;

deserializer means inserted between said serial outgoing multiplex channels and said parallel outgoing multiplex channels for converting serial P.C.M words having their bits in series in consecutive time slots of the serial outgoing multiplex channels into parallel P.C.M. words having their bits in concomitant time slots of the parallel outgoing multiplex channels;

an incoming buffer store in each of said incoming time division switching networks adapted for having stored therein P.C.M. words;

means for cyclically transferring the P.C.M. words conveyed by said incoming multiplex circuit time slots into words of said incoming buffer stores permanently associated with said incoming multiplex circuit time slots;

an outgoing buffer store in each of said outgoing time division switching networks adapted for having stored therein P.C.M. words;

means for cyclically transferring the P.C.M. words stored in said outgoing buffer stores into outgoing multiplex circuit time slots permanently associated with said outgoing buffer store words;

a space division switching network having inputs and outputs respectively connected to said serial incoming and serial outgoing time division group highways and including a number of gate means equal to the number of the P.C.M. word bits for selectively connecting groups of consecutive time slots in each serial incoming and each serial outgoing group highway; and a single control store means for, during a given time slot, transferring a first parallel P.C.M. word stored in a word of a first incoming buffer store permanently associated with a first incoming multiplex circuit time slot into a time slot of a first parallel incoming group highway, converting said first parallel P.C.M. word into a first series P.C.M. word conveyed in consecutive time slots of a first serial incoming multiplex channel, enabling the gate means connecting said first serial incoming multiplex channel time slots to time slots of a first serial outgoing multiplex channel, converting said first series P.C.M. word conveyed in consecutive time slots of said first serial outgoing multiplex channel into said first P.C.M. word conveyed in a first parallel outgoing group highway and transferring said first P.C.M. word conveyed in said first outgoing group highway time slot into a word of a first outgoing buffer store permanently associated with a first outgoing multiplex circuit time slot and, in the same given time slot, transferring a second parallel P.C.M. word stored in a word of a second incoming buffer store permanently associated with a second incoming multiplex circuit time slot into a time slot of a second parallel incoming group highway, converting said second parallel P.C.M. word into a second series P.C.M. word conveyed in consecutive time slots of a second serial incoming multiplex channel, enabling the gate means connecting said second serial incoming multiplex channel time slots to time slots of a second serial outgoing multiplex channel, converting said second series P.C.M. word conveyed in consecutive time slots of said second serial outgoing multipled channel into said second P.C.M. word conveyed in a second parallel outgoing group highway and transferring said second P.C.M. word conveyed in said second outgoing group highway time slot into a word of a second outgoing buffer store permanently associated with a first outgoing multiplex circuit time slot.

* * * * *